(12) United States Patent
Ishikawa et al.

(10) Patent No.: US 11,007,722 B2
(45) Date of Patent: May 18, 2021

(54) DIELECTRIC-HEATING BONDING FILM AND JOINING METHOD USING DIELECTRIC-HEATING BONDING FILM

(71) Applicant: LINTEC CORPORATION, Tokyo (JP)

(72) Inventors: Masakazu Ishikawa, Tokyo (JP); Tatsuya Izumi, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 46 days.

(21) Appl. No.: 16/344,621

(22) PCT Filed: Oct. 18, 2017

(86) PCT No.: PCT/JP2017/037616
§ 371 (c)(1),
(2) Date: Apr. 24, 2019

(87) PCT Pub. No.: WO2018/079354
PCT Pub. Date: May 3, 2018

(65) Prior Publication Data
US 2020/0063001 A1 Feb. 27, 2020

(30) Foreign Application Priority Data

Oct. 27, 2016 (JP) .............................. JP2016-210218
Feb. 9, 2017 (JP) .............................. JP2017-021803
Feb. 9, 2017 (JP) .............................. JP2017-021806

(51) Int. Cl.
*C09J 11/04* (2006.01)
*B29C 65/04* (2006.01)
(Continued)

(52) U.S. Cl.
CPC .............. *B29C 65/04* (2013.01); *B29C 65/40* (2013.01); *B29C 65/425* (2013.01); *B29C 65/50* (2013.01);
(Continued)

(58) Field of Classification Search
CPC ....... B29C 65/04; B29C 65/40; B29C 65/425; B29C 65/50
See application file for complete search history.

(56) References Cited

U.S. PATENT DOCUMENTS

| | | | | |
|---|---|---|---|---|
| 5,277,737 A | * | 1/1994 | Li | ........................... B29C 65/04 |
| | | | | 156/274.8 |
| 2011/0104496 A1 | * | 5/2011 | Cook | ....................... C08K 3/01 |
| | | | | 428/404 |

FOREIGN PATENT DOCUMENTS

| CN | 101490146 A | 7/2009 |
|---|---|---|
| EP | 2029664 A2 | 3/2009 |

(Continued)

OTHER PUBLICATIONS

Sano et al., "High-frequency welding of glass-fibre-reinforced polypropylene with a thermoplastic adhesive layer: Effects of ceramic type and long-term exposure on lap shear strength," 2015. (Year: 2015).*

(Continued)

*Primary Examiner* — Daniel McNally
(74) *Attorney, Agent, or Firm* — McDermott Will & Emery LLP (57) ABSTRACT

A dielectric welding film capable of tightly welding adherends of a polyolefin resin or the like within a relatively short time through dielectric heating, and a bonding method using the dielectric welding film are provided. The dielectric welding film is configured to bond a plurality of adherends of the same material or different materials through dielectric heating, the dielectric welding film containing (A) a poly- (Continued)

olefin resin and (B) a dielectric filler whose mean particle size measured in accordance with JIS Z 8819-2 (2001) is in a range from 1 to 30 µm, a thickness of the dielectric welding film ranging from 10 to 2,000 µm. The method uses the dielectric welding film.

10 Claims, 4 Drawing Sheets

(51) Int. Cl.
| | |
|---|---|
| B29C 65/42 | (2006.01) |
| B29C 65/50 | (2006.01) |
| C08K 3/22 | (2006.01) |
| C09J 123/26 | (2006.01) |
| C09J 129/14 | (2006.01) |
| C09J 131/04 | (2006.01) |
| C09J 167/00 | (2006.01) |
| C09J 177/00 | (2006.01) |
| H05B 6/46 | (2006.01) |
| B29C 65/40 | (2006.01) |
| C09J 123/00 | (2006.01) |
| C09J 125/04 | (2006.01) |
| H05B 6/64 | (2006.01) |
| C09J 7/00 | (2018.01) |
| C09J 201/00 | (2006.01) |
| C09J 123/10 | (2006.01) |
| C09J 7/35 | (2018.01) |
| C09J 5/06 | (2006.01) |
| C09J 9/00 | (2006.01) |
| H01B 3/44 | (2006.01) |
| H01B 17/56 | (2006.01) |
| H05B 6/50 | (2006.01) |
| C08K 3/14 | (2006.01) |

(52) U.S. Cl.
CPC .................. *C08K 3/22* (2013.01); *C09J 5/06* (2013.01); *C09J 7/00* (2013.01); *C09J 7/35* (2018.01); *C09J 9/00* (2013.01); *C09J 11/04* (2013.01); *C09J 123/00* (2013.01); *C09J 123/10* (2013.01); *C09J 123/26* (2013.01); *C09J 125/04* (2013.01); *C09J 129/14* (2013.01); *C09J 131/04* (2013.01); *C09J 167/00* (2013.01); *C09J 177/00* (2013.01); *C09J 201/00* (2013.01); *H01B 3/441* (2013.01); *H01B 17/56* (2013.01); *H05B 6/46* (2013.01); *H05B 6/50* (2013.01); *H05B 6/64* (2013.01); *C08K 3/14* (2013.01); *C08K 2003/2296* (2013.01); *C08K 2201/005* (2013.01); *C09J 2203/326* (2013.01); *C09J 2301/408* (2020.08); *C09J 2301/416* (2020.08); *C09J 2423/10* (2013.01)

(56) References Cited

FOREIGN PATENT DOCUMENTS

| EP | 3608380 A1 | 2/2020 |
|---|---|---|
| JP | S58-174474 A | 10/1983 |
| JP | H02-261626 A | 10/1990 |
| JP | H04-015282 A | 1/1992 |
| JP | H08-072055 A | 3/1996 |
| JP | H08-258173 A | 10/1996 |
| JP | H09-067461 A | 3/1997 |
| JP | H11-157398 A | 6/1999 |
| JP | 2001-146524 A | 5/2001 |
| JP | 2001-260231 A | 9/2001 |
| JP | 2003-193009 A | 7/2003 |
| JP | 2003-238745 A | 8/2003 |
| JP | 2008-156510 A | 7/2008 |
| JP | 2009-538971 A | 11/2009 |
| JP | 2010-6908 A | 1/2010 |
| JP | 2014-37489 A | 2/2014 |

OTHER PUBLICATIONS

International Preliminary Report on Patentability issued in corresponding International Patent Application No. PCT/JP2017/037616, dated Apr. 30, 2019.
Office Action issued in corresponding Japanese Patent Application No. 2019-013490, dated May 29, 2019, with English translation.
Sano Masaru et al.,"High-frequency welding of glass-fibre-reinforced polypropylene with a thermoplastic adhesive layer: Effects of ceramic type and long-term exposure on lap shear strength," International Journal of Adhesion & Adhesives, Elsevier, Amsterdam, NL vol. 59, Feb. 7, 2015, pp. 7-13, XP029213460.
Extended European Search Report issued in corresponding European Patent Application No. 17863456.4, dated Jun. 2, 2020.
International Search Report issued in corresponding International Patent Application No. PCT/JP2017/037616, dated Dec. 12, 2017, with English Translation.
Maseru Sano, et al., High-frequency welding of glass-fiber-reinforced polypropylene with a thermoplastic adhesive layer including SiC, International Journal of Adhesion & Adhesives , vol. 54, Jun. 2, 2014, pp. 124-130.
Chinese Office Action issued in corresponding Chinese Patent Application No. 201780066578.9, dated Nov. 24, 2020, with English translation.

* cited by examiner

DIELECTRIC-HEATING BONDING FILM AND JOINING METHOD USING DIELECTRIC-HEATING BONDING FILM

CROSS REFERENCE

This application is the U.S. National Phase under 35 U.S.C. § 371 of International Application No. PCT/JP2017/037616, filed on Oct. 18, 2017, which claims the benefit of Japanese Patent Application No. 2016-210218, filed Oct. 27, 2016, Japanese Patent Application No. 2017-021806, filed Feb. 9, 2017 and Japanese Patent Application No. 2017-021803, filed Feb. 9, 2017, the entire contents of each are hereby incorporated by reference.

TECHNICAL FIELD

The present invention relates to a dielectric welding film, and a bonding method using the dielectric welding film.

Specifically, the present invention relates to a dielectric welding film, which is usable for a typically hard-to-bond adherend and is capable of providing a large bonding force through a relatively short period of dielectric heating (sometimes referred to as high-frequency dielectric heating hereinafter), and a bonding method using the dielectric welding film.

BACKGROUND ART

In order to bond a plurality of typically hard-to-bond adherends (i.e. difficult to be bonded), it has been recently proposed that, for instance, a bonding process such as dielectric heating, induction heating, ultrasonic welding or laser welding is performed with an adhesive produced by blending a heat-generating material in a predetermined resin.

According to a proposed bonding method by dielectric heating among the above, an adhesive blended with carbon black (CB), silicon carbide (SiC), or the like is interposed between a plurality of adherends and dielectric heating at a frequency of 28 or 40 MHz or microwave heating is applied to bond the plurality of adherends (see Patent Literatures 1 and 2).

According to another proposed bonding method by dielectric heating, polyolefin resin is blended with a ferroelectric material and a carbon compound or a conductive material to prepare an adhesive with a dissipation factor (tan δ) of 0.03 or more, and the adhesive is interposed between a plurality of adherends to weld the adherends through dielectric heating at a frequency of 40 MHz (see Patent Literatures 3 and 4).

According to still another proposed related art, an adhesive composition for dielectric heating is produced by adding a dielectric heating medium to an adhesive compatible with a plurality of adherends (base materials) to be bonded. The adhesion layer composition for dielectric heating satisfies a formula: $C \times \{(\tan \delta)/\varepsilon'\}^{1/2} \geq d$, where $\varepsilon'$ represents specific permittivity, tan δ represents a dissipation factor, d (mm) represents a total thickness of the base materials to be bonded, and the coefficient C is in a range from 78 to 85 (see Patent Literature 5).

CITATION LIST

Patent Literature(s)

| Patent Literature 1 | JP 2010-6908 A (claims etc.) |
| Patent Literature 2 | JP 2008-156510 A (claims etc.) |
| Patent Literature 3 | JP 2003-238745 A (claims etc.) |
| Patent Literature 4 | JP 2003-193009 A (claims etc.) |
| Patent Literature 5 | JP 2014-37489 A (claims etc.) |

SUMMARY OF THE INVENTION

Problem(s) to be Solved by the Invention

However, the dielectric heating process disclosed in Patent Literature 1 or 2, in which a considerable amount of the conductive material such as carbon black (CB) is blended in the adhesive to prepare the adhesion layer composition, is likely to cause electric breakdown during the dielectric heating to carbonize a bonded portion and/or the adherends.

In addition, vertical alignment of the adherends is difficult due to the color of the resultant adhesion layer composition (i.e. perfectly opaque black (visible light transmissivity: 0%)), so that it is difficult to apply the dielectric heating at an accurate position.

The dielectric heating process disclosed in Patent Literature 3 or 4 is also likely to cause electric breakdown during the dielectric heating due to a considerable amount of the conductive material (e.g. metal and carbide compound) added in the adhesive resin composition.

In addition, vertical alignment of the adherends is also difficult because of poor transparency of the resultant adhesive resin composition (i.e. perfectly opaque (visible light transmissivity: 0%)), so that it is difficult to apply the dielectric heating at an accurate position.

According to the adhesion layer composition for dielectric heating disclosed in Patent Literature 5, the types of usable adherends are likely to be extremely limited.

In addition, in order to ensure sufficient bonding strength, dielectric heating has to be applied for at least 40 to 70 seconds, which is considerably long in terms of practical use.

In view of the above, the inventors have found through dedicated studies that excellent bondability of a plurality of typically hard-to-bond adherends (i.e. irrespective of the type of the adherends) can be obtained even with a polyolefin-resin-based welding film through, for instance, dielectric heating of less than 40 seconds, as long as a mean particle size (median diameter: D50) of the contained dielectric filler is controlled. The invention has been made based on the above findings.

An object of the invention is to provide a dielectric heating adhesive including a combination of a predetermined resin and a predetermined dielectric filler capable of preventing occurrence of electric breakdown and tightly bonding typically hard-to-bond adherends within an extremely short time, and to provide a bonding method using a predetermined dielectric welding film.

Means for Solving the Problems

A dielectric welding film according to an aspect of the invention is configured to bond a plurality of adherends of the same material or different materials through dielectric heating, the dielectric welding film including:

(A) a polyolefin resin; and (B) a dielectric filler whose mean particle size measured in accordance with JIS Z 8819-2 (2001) is in a range from 1 to 30 μm, in which a thickness of the dielectric welding film is in a range from 10 to 2000 μm. The above-described problems can be solved by the dielectric welding film.

The dielectric welding film according to the above aspect of the invention provides excellent bondability through dielectric heating of, for instance, less than 40 seconds irrespective of the type of the adherends.

In the dielectric welding film according to the above aspect of the invention, the content of the (B) component is preferably in a range from 5 to 800 parts by weight with respect to 100 parts by weight the (A) component.

At the dielectric content of the (B) component, excellent bondability can be obtained through a relatively short period of dielectric heating irrespective of the type of the adherends.

In the dielectric welding film according to the above aspect of the invention, the (A) component is preferably a polypropylene resin whose melting point or softening point is in a range from 80 to 200 degrees C.

The (A) component (i.e. the polypropylene resin) having the above melting point or softening point can achieve an excellent balance between heat resistance in a use environment and weldability during the dielectric heating.

In the dielectric welding film according to the above aspect of the invention, the (B) component is preferably zinc oxide.

The (B) component in a form of zinc oxide can exhibit a predetermined exothermic effect during the dielectric heating even in a relatively small amount.

In the dielectric welding film according to the above aspect of the invention, a dielectric property (tan δ/ε') defined by dividing a dissipation factor tan δ by a permittivity ε' at 23 degrees C. and 40 MHz frequency is preferably 0.005 or more.

By controlling the above value of the dielectric property, excellent weldability during the dielectric heating can be ensured and, consequently, a plurality of adherends can be tightly bonded.

In the dielectric welding film according to the above aspect of the invention, a storage modulus E' measured at 80 degrees C. and 10 Hz frequency are preferably both in a range from $1\times10^6$ to $1\times10^{10}$ Pa.

By controlling the storage modulus E' measured under the predetermined conditions, predetermined handleability as the dielectric welding film can be ensured, the dielectric welding film can be wound into an elongated roll, and the dielectric welding film is relatively easily applicable to a roll-to-roll process.

A bonding method according to another aspect of the invention uses a dielectric welding film configured to bond a plurality of adherends of the same material or different materials through dielectric heating, the dielectric welding film including (A) a polyolefin resin and (B) a dielectric filler whose mean particle size measured in accordance with JIS Z 8819-2 (2001) is in a range from 1 to 30 μm, a thickness of the dielectric welding film ranging from 10 to 2000 μm, the method including:

(1) holding the dielectric welding film between the plurality of adherends of the same material or different materials; and (2) applying the dielectric heating on the dielectric welding film held between the plurality of adherends with a dielectric heater at a high-frequency output ranging from 0.1 to 20 kW and a high-frequency-wave application time of 1 second or more and less than 40 seconds.

The dielectric welding film according to the above aspect of the invention provides excellent bondability through a relatively short period of dielectric heating time of, for instance, less than 40 seconds irrespective of the type of the adherends.

DESCRIPTION OF EMBODIMENT(S)

First Exemplary Embodiment

A dielectric welding film according to a first exemplary embodiment is configured to weld adherends of the same material or different materials through dielectric heating, the dielectric welding film including:

(A) a polyolefin resin; and (B) a dielectric filler whose mean particle size (D50) measured in accordance with JIS Z 8819-2 (2001) is in a range from 1 to 30 μm, a thickness of the dielectric welding film ranging from 10 to 2000 μm. The components, properties, and the like of the dielectric welding film according to the first exemplary embodiment will be specifically described below.

1 Components of Dielectric Welding Film (1)(A) Component: Polyolefin Resin

Type

Examples of the polyolefin resin (main component), the type of which is not limited, include homopolymer resins such as polyethylene, polypropylene, polybutene, and polymethylpentene, and α-olefin resins of copolymers of ethylene, propylene, butene, hexene, octene, 4-methylpentene, and the like. The polyolefin resin may consist of a single one of the resins above, or may be a combination of two or more thereof. Among the polyolefin resins, polypropylene resin is especially preferable in terms of its excellent mechanical strength and stable welding properties.

Melting Point Or Softening Point

The melting point or softening point of the polyolefin resin is preferably in a range from 80 to 200 degrees C.

Specifically, a crystalline polyolefin resin, whose melting point (i.e. a temperature at which a crystalline portion is melted) measured by a differential scanning calorimeter (DSC) or the like is defined within a predetermined range, can achieve a good balance between heat resistance in a use environment and the like and weldability during the dielectric heating.

More specifically, the melting point may be determined using a differential scanning calorimeter (DSC) by: raising a temperature of a 10-mg measurement sample (crystalline polyolefin resin) to 250 degrees C.; cooling the measurement sample to 25 degrees C. at a temperature-decrease rate of 10 degrees C./min to crystallize the measurement sample; again heating the measurement sample at a temperature-increase rate of 10 degrees C./min to re-melt the sample; and measuring a peak temperature (melting point) of a melting peak observed on a DSC chart (fusion curve) when the sample is re-melted.

An amorphous polyolefin resin, whose softening point (glass transition point) (i.e. a temperature at which an amorphous portion is melted) measured in accordance with a ring-and-ball method or the like is defined within a predetermined range, can also achieve a good balance between heat resistance and weldability during the dielectric heating.

More specifically, the softening point of the amorphous polyolefin resin can be measured in accordance with JIS K 6863 (1994).

In either case, when the melting point of the crystalline polyolefin resin or the softening point of the amorphous polyolefin resin falls below 80 degrees C., the heat resistance may become so insufficient that the applicable range may be extremely limited and/or mechanical strength may be significantly reduced.

In contrast, when the melting point of the crystalline polyolefin resin or the softening point of the amorphous polyolefin resin exceeds 200 degrees C., welding through the dielectric heating may take extremely long time and/or the bonding strength may be extremely decreased.

The melting point or the softening point of the dielectric welding film of the first exemplary embodiment, which may either a crystalline polyolefin resin or an amorphous polyolefin resin, more preferably ranges from 100 to 190 degrees C., further preferably from 130 to 180 degrees C.

A relationship between the melting point or the softening point of the (A) component and a high-temperature creep test will be described below with reference to FIG. 1.

Figure 1:
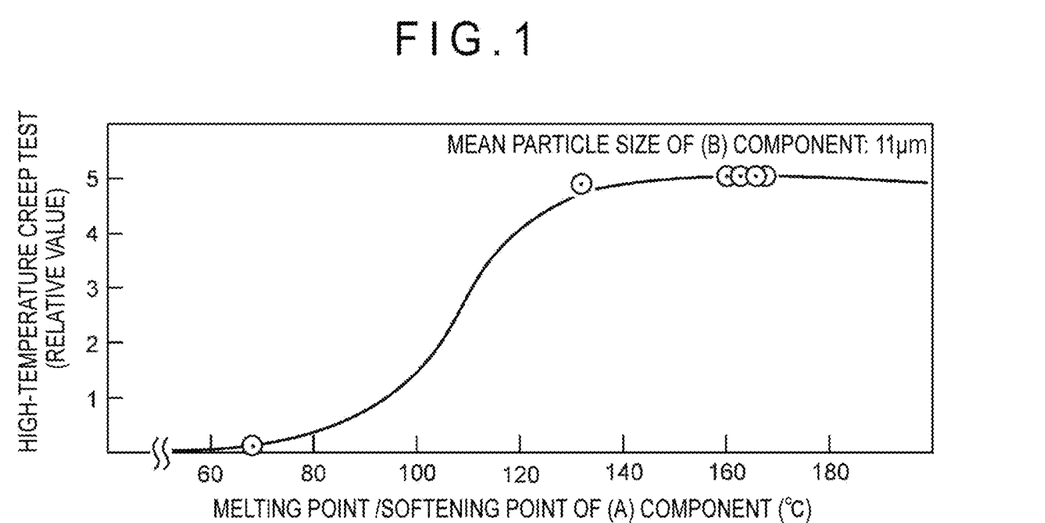
FIG. 1 illustrates an influence of a melting point or a softening point of a (A) component (polyolefin resin) on a high-temperature creep test.

An abscissa axis of FIG. 1 represents the melting point or the softening point of the (A) component (degrees C.). An ordinate axis of FIG. 1 represents a result of the high-temperature creep test (relative evaluation). More specifically, the relative evaluation was done as an evaluation of Example 1 below, where the mark ⊚ was rated as 5 points, the mark ○ was rated as 3 points, the mark Δ was rated as 1 point, and the mark x was rated as 0 points.

As can be understood from the characteristic curve in FIG. 1, when the melting point or the like of the (A) component is as low as approximately 70 degrees C., the score of the relative evaluation of the result of the high-temperature creep test tends to be low, whereas the score of the relative evaluation tends to improve with an increase in the melting point or the like.

More specifically, when the melting point or the like of the (A) component is 130 degrees C. or more, 3 or more scores of the evaluation value can be obtained in the high-temperature creep test.

Accordingly, it is found that the melting point or the like of the (A) component is preferably in a range from, for instance, 120 to 200 degrees C. based only on the results of the high-temperature creep test.

Average Molecular Weight

The average molecular weight (weight average molecular weight) of the polyolefin resin is usually preferably in a range from 5000 to 300000.

This is because, when the weight average molecular weight of the polyolefin resin falls below 5000, the heat resistance and/or the bonding strength may be significantly reduced.

In contrast, when the weight average molecular weight of the polyolefin resin exceeds 300000, the weldability and the like resulting from the dielectric heating may be significantly reduced.

The weight average molecular weight of the polyolefin resin is thus more preferably in a range from 10000 to 200000, further preferably from 30000 to 100000.

It should be noted that the weight average molecular weight of the polyolefin resin can be measured through, for instance, an intrinsic viscosity method in accordance with JIS K 7367-3 (1999).

The melt flow rate (MFR) of the polyolefin resin is usually preferably in a range from 1 to 300 g/10 min at 230 degrees C. under 2.16 kg load. When the MFR is 1 g/10 min or more, the heat resistance at the welded portion is improved. Further, when the MFR is 300 g/10 min or less, the bonding time through the dielectric heating can be reduced, resulting in stable welding properties.

The MFR of the polyolefin resin is thus more preferably in a range from 1 to 100 g/10 min, further preferably from 1 to 50 g/10 min. It should be noted that the MFR of the polyolefin resin can be measured at 230 degrees C. under 2.16 kg load in accordance with JIS K 7210-1 (2014).

(2) B Component: Dielectric Filler

Type

The dielectric filler (main component) is a high-frequency-wave absorbing filler having a high dielectric loss factor enough to generate heat when a high-frequency wave of, for instance, 28 MHz or 40 MHz frequency is applied.

Such a dielectric filler is preferably a single one of or a combination of two or more of compounds selected from zinc oxide, silicon carbide (SiC), anatase-type titanium oxide, barium titanate, barium zirconate titanate, lead titanate, potassium niobate, rutile-type titanium oxide, hydrated aluminum silicate, inorganic substance having crystallization water such as hydrated aluminosilicate salt of alkali metal or alkaline earth metal, and the like. Among the above, zinc oxide, which includes various types, provides wide selection of shapes and sizes, and allows modification of welding and mechanical properties of the dielectric welding film in accordance with the intended use, is especially preferable as the dielectric filler.

Content

The content of the (B) component is preferably in a range from 5 to 800 parts by weight with respect to 100 parts by weight of the (A) component.

This is because, when the content of the (B) component becomes excessively small, heat-generating performance may become poor, so that the (A) component may be less likely to be melted, failing to provide strong bonding after the dielectric heating.

In contrast, when the content of the (B) component becomes excessively large, fluidity of the dielectric welding film during the dielectric heating may be excessively reduced.

The content of the (B) component is thus preferably in a range from 30 to 600 parts by weight with respect to 100 parts by weight of the (A) component, more preferably in a range from 50 to 300 parts by weight.

Mean Particle Size

A mean particle size (median diameter: D50) of the (B) component measured in accordance with JIS Z 8819-2 (2001) is in a range from 1 to 30 μm.

This is because, when the mean particle size is less than 1 μm, the filler is less polarized because of the reduction in the polarizable distance inside the filler to reduce inversion motion caused when a high-frequency wave is applied, so that the dielectric heating performance may be too decreased to tightly bond the adherends.

In contrast, as the mean particle size increases, the filler is more polarized because of the increase in the polarizable distance inside the filler, so that the inversion motion caused when a high-frequency wave is applied is intensified, thereby improving the dielectric heating performance.

However, when the mean particle size exceeds 30 μm, the distance between neighboring dielectric fillers becomes short and the inversion motion caused when a high-frequency wave is applied is attenuated under the influence of an electric charge of the neighboring dielectric fillers, so that the dielectric heating performance may be too decreased to tightly weld the adherends.

The mean particle size of the (B) component is thus more preferably in a range from 2 to 25 μm, further preferably from 3 to 20 μm.

A relationship between the mean particle size of the (B) component and high-frequency weldability when the dielectric welding film.
is used will be described below with reference to FIG. 2.

Figure 2:
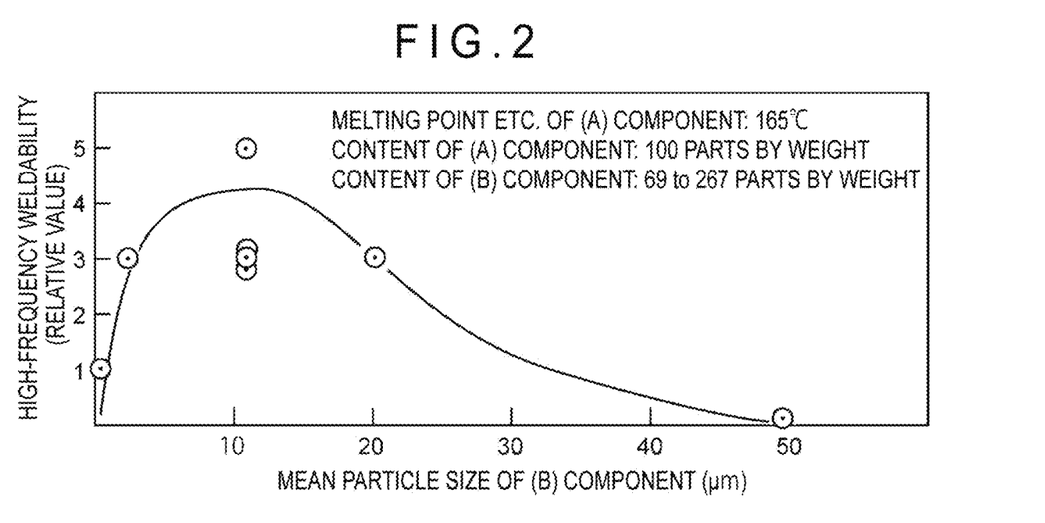
FIG. 2 illustrates an influence of a mean particle size of a (B) component (dielectric filler) on high-frequency weldability of a dielectric welding film.

An abscissa axis of FIG. 2 represents the mean particle size of the (B) component (μm). An ordinate axis of FIG. 2 represents a value of welding strength (relative evaluation). More specifically, the relative evaluation was done as an evaluation of Example 1 below, where the mark ⊚ was rated as 5 points, the mark ○ was rated as 3 points, the mark Δ was rated as 1 point, and the mark x was rated as 0 points.

As can be understood from the characteristic curve in FIG. 2, there is an optimum value of the mean particle size of the (B) component for the welding strength.

Specifically, when the mean particle size of the (B) component is excessively small (e.g. 0.4 μm), the adherends cannot be sufficiently welded by applying the high-frequency wave.

In contrast, when the mean particle size of the (B) component becomes relatively large (e.g. 2 μm), the evaluation of the high-frequency weldability rapidly improves.

Further, when the mean particle size of the (B) component becomes considerably large (e.g. 10 to 20 μm), the evaluation of the high-frequency weldability is substantially stabilized and is improved as compared with the (B) component of excessively small mean particle size.

In contrast, when the mean particle size of the (B) component exceeds 40 μm (e.g. 50 μm), the evaluation of the high-frequency weldability is reduced, instead of being improved, to a level substantially the same as that of the excessively small mean particle size.

Thus, there is an optimal value in the mean particle size of the (B) component for the high-frequency weldability with the dielectric welding film. For instance, the mean particle size is more preferably in a range from 1 to 30 μm, further preferably from 2 to 20 μm.

A relationship between the mean particle size of the (B) component and dielectric property represented by tan δ/ε' will be described below with reference to FIG. 3.

Figure 3:
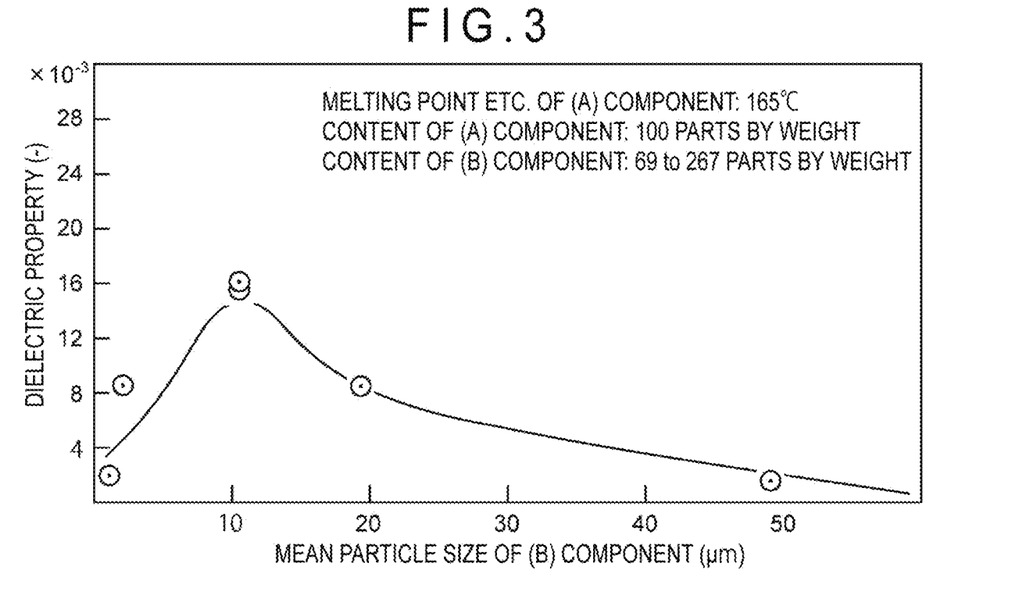
FIG. 3 illustrates an influence of a mean particle size of the (B) component (dielectric filler) on dielectric property (tanδ/ε').

An abscissa axis of FIG. 3 represents the mean particle size of the (B) component (μm). An ordinate axis of FIG. 3 represents dielectric property represented by a value of tan δ/ε'×10$^{-3}$.

As can be understood from the characteristic curve in FIG. 3, there is an optimum value of the mean particle size of the (B) component for the dielectric property.

Specifically, when the mean particle size of the (B) component is excessively small (e.g. 0.4 μm), the dielectric property is so low that it is estimated that adherends cannot be sufficiently welded by applying the high-frequency wave.

In contrast, when the mean particle size of the (B) component is relatively large (e.g. 2 μm), the value of the dielectric property rapidly improves to exceed 0.005 at least.

Further, when the mean particle size of the (B) component is approximately 10 μm, the value of the dielectric property is, though slightly fluctuates, at least in a range from 0.008 to 0.01.

In contrast, when the mean particle size of the (B) component exceeds 10 μm to be approximately 20 μm, the evaluation of the dielectric property is reduced to fall below 0.008.

Further, when the mean particle size of the (B) component exceeds 40 μm to be approximately 50 μm, the evaluation of the dielectric property is considerably reduced (less than 0.002).

Thus, there is an optimal value in the mean particle size of the (B) component for the dielectric property represented by tan δ/ε'. In order to achieve a relatively high value, the mean particle size is, for instance, more preferably in a range from 1 to 20 μm, further preferably from 2 to 15 μm.

A relationship between the types (total 6) and contents (3 levels) of the (B) component and the dielectric property represented by tan δ/ε' will be described below with reference to FIG. 4.

Figure 4:
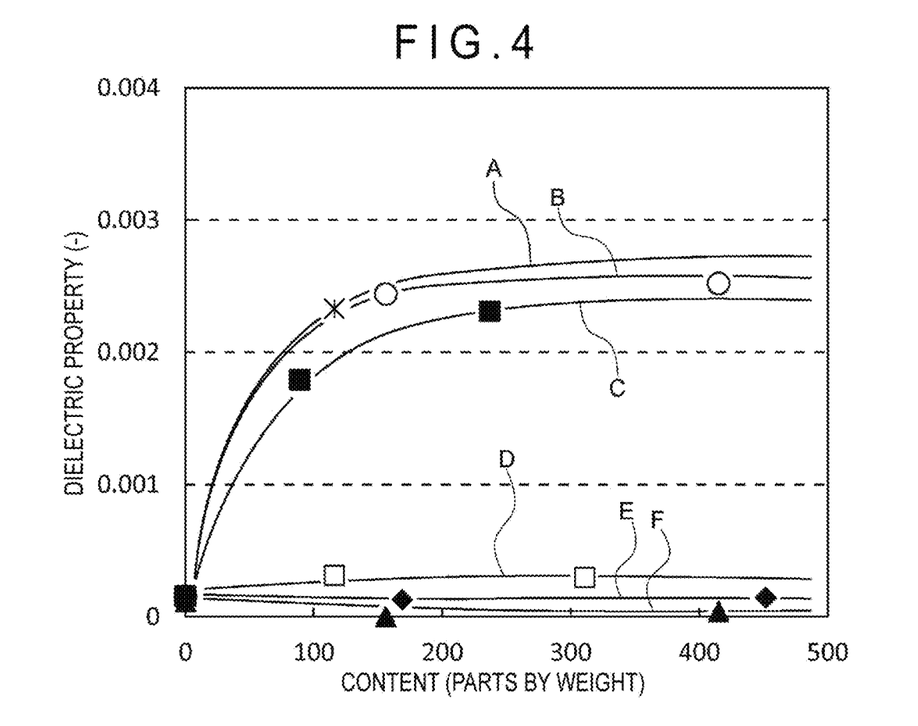
FIG. 4 illustrates an effect of the type (6 types) and content (3 levels) of the (B) component (dielectric filler) on the dielectric property (tanδ/ε').

An abscissa axis of FIG. 4 represents the content of the (B) component (parts by weight) with respect to 100 parts by weight of the (A) component. An ordinate axis of FIG. 4 represents a value of the dielectric property represented by tan δ/ε'.

It should be noted that a characteristic curve A corresponds to $TiO_2$ (anatase-type crystal), a characteristic curve B corresponds to ZnO, a characteristic curve C corresponds to SiC, a characteristic curve D corresponds to $TiO_2$ (rutile-type crystal), a characteristic curve E corresponds to $BaTiO_3$, and a characteristic curve F corresponds to $ZrO_2$.

As can be understood from the characteristic curves A to C in FIG. 4, when the (B) component is $TiO_2$ (anatase-type crystal), ZnO, or SiC, the value of the dielectric property (tan δ/ε') considerably increases with an increase in the content of the (B) component to approximately 150 parts by weight.

Further, as can be understood from the characteristic curves A to C in FIG. 4, when the content increases to approximately 350 parts by weight, the value of the dielectric property (tan δ/ε') further increases, although seemingly partially saturated.

In contrast, as can be understood from the characteristic curves D to F, when the (B) component is $TiO_2$ (rutile-type crystal), $BaTiO_3$, or $ZrO_2$, the value of the dielectric property (tan δ/ε') is substantially unchanged irrespective of an increase in the content of the (B) component to approximately 150 parts by weight.

Thus, the type and content of the (B) component have a strong impact on the dielectric property represented by tan δ/ε'. In order to achieve a relatively high value, the content of the (B) component is more preferably, for instance, in a range from 50 to 500 parts by weight with respect to 100 parts by weight of the (A) component, further preferably from 100 to 400 parts by weight.

(3) Additive

The dielectric welding film is preferably added with at least one of additives such as tackifier, plasticizer, wax, coloring agent, antioxidant, ultraviolet absorber, antibacterial agent, coupling agent, viscosity modifier, and organic or inorganic filler other than the dielectric filler.

The tackifier and the plasticizer can improve melting and welding properties of the dielectric welding film. Examples of the tackifier include rosin derivative, polyterpene resin, aromatic modified terpene resin and hydrogenated products thereof, terpene phenol resin, coumarone•indene resin, aliphatic petroleum resin, and aromatic petroleum resin and hydrogenated products thereof. Examples of the plasticizer include petroleum process oil such as paraffin process oil, naphthene process oil and aromatic process oil, natural oil such as castor oil and tall oil, and low-molecular-weight liquid polymer such as diacid dialkyl (e.g. dibutyl phthate, dioctyl phthate, and dibutyl adipate), liquid polybutene and liquid polyisoprene.

When the additive is added, the content of the additive is typically preferably in a range from 0.1 to 20 wt % of a total amount of the dielectric welding film, more preferably in a range from 1 to 10 wt %, further preferably in a range from 2 to 5 wt %, though depending on the type and purpose of the additive.

2 Properties of Dielectric Welding Film (1) Thickness

The thickness of the dielectric welding film is in a range from 10 to 2000 μm.

This is because, when the thickness of the dielectric welding film is 10 μm, the bonding strength between the adherends sometimes rapidly decreases.

Meanwhile, when the thickness of the dielectric welding film exceeds 2000 μm, it is sometimes difficult to wind the dielectric welding film into a roll and to apply the dielectric welding film to a roll-to-roll process.

Accordingly, the thickness of the dielectric welding film is typically more preferably in a range from 100 to 1000 μm, further preferably in a range from 200 to 600 μm, though depending on the usage of the dielectric welding film and the like.

(2) Dielectric Property (Tan δ/ε')

With regard to the properties of the dielectric welding film, it is preferable that dielectric property (tan δ/ε'), which is represented by a dissipation factor tan δ measured at 23 degrees C. and 40 MHz frequency and permittivity ε' measured in the same manner, is 0.005 or more.

This is because, when the dielectric property (tan δ/ε') is less than 0.005, the dielectric welding film does not generate heat as desired through the dielectric heating irrespective of the type of the polyolefin resin and the like, sometimes making it difficult to tightly bond the adherends.

However, when the value of the dielectric property (tan δ/ε') becomes excessively large, it sometimes occurs that the types of usable polyolefin resin and dielectric filler are excessively limited and/or total light transmissivity is rapidly reduced.

Accordingly, the dielectric property (tan δ/ε') of the dielectric welding film is more preferably in a range from 0.008 to 0.05, further preferably in a range from 0.01 to 0.03.

It should be noted that the measurement method of the dielectric property (tan δ/ε') of the dielectric welding film will be detailed below in later-described Example 1.

(3) Light Transmissivity

Total light transmissivity of the dielectric welding film is preferably 1% or more, more preferably 5% or more, further preferably 10% or more.

This is because, when the total light transmissivity (%) is less than 1%, it may become virtually difficult to visually locate the dielectric welding film of an excessive thickness at a predetermined point using transmitted light or the like. The upper limit of the light transmissivity of the dielectric welding film, which is not specifically limited, is usually approximately 50% depending on a preferable blend ratio of the polyolefin resin and the dielectric filler and the like.

It should be noted that the measurement method of the total light transmissivity (%) of the dielectric welding film will be detailed below in later-described Example 1.

(4) Viscoelastic Property

With regard to viscoelastic property (dynamic elastic modulus) of the dielectric welding film, it is preferable that storage modulus E' measured at 10 Hz frequency is in a range from $1 \times 10^6$ to $1 \times 10^{10}$ Pa both at a room temperature and at 80 degrees C.

This is because, when the storage modulus E' is less than $1 \times 10^6$ Pa at a room temperature or at 80 degrees C., the surface of the dielectric welding film may become tacky to cause blocking, which makes it difficult to store the dielectric welding film in a roll.

Meanwhile, when the storage modulus E' exceeds $1 \times 10^{10}$ Pa at a room temperature or at 80 degrees C., the dielectric welding film may become brittle to make it difficult to unroll the dielectric welding film or adhere the dielectric welding film on an adherend while applying a high tension.

Accordingly, the storage modulus E' of the dielectric welding film is more preferably in a range from $5 \times 10^6$ Pa to $5 \times 10^9$ Pa at a room temperature and at 80 degrees C., further preferably in a range from $1 \times 10^7$ Pa to $1 \times 10^9$ Pa.

It should be noted that the measurement method of the storage modulus E' of the dielectric welding film will be detailed below in later-described Example 1.

Second Exemplary Embodiment

In a second exemplary embodiment, a bonding method using a dielectric welding film for welding adherends of the same material or different materials through dielectric heating will be described.

The dielectric welding film includes (A) a polyolefin resin and (B) a dielectric filler whose mean particle size measured in accordance with JIS Z 8819-2 (2001) is in a range from 1 to 30 μm. The thickness of the dielectric welding film is in a range from 10 to 2000 μm. The bonding method includes the following steps (1) and (2): (1) holding the dielectric welding film between a plurality of adherends of the same material or different materials; and (2) applying dielectric heating on the dielectric welding film held between the plurality of adherends with a dielectric heater at a high-frequency output ranging from 0.1 to 20 kW for a high-frequency-wave application time of 1 second or more and less than 40 seconds.

The bonding method of the dielectric welding film according to the second exemplary embodiment will be described below mainly on features different from those in the first exemplary embodiment.

1. Step (1)

In the step (1), the dielectric welding film is disposed at a predetermined position, where the dielectric welding film is held between the plurality of adherends of the same material or different materials.

At this time, it is usually preferable to hold the dielectric welding film between the plurality of adherends after the dielectric welding film is cut into pieces of a predetermined shape.

Moreover, it is also preferable, in order to locate the dielectric welding film at a correct position without position gap, to provide a sticky portion all over or on a part of one side or both sides of the dielectric welding film and/or to provide a temporary fixing hole or projection on a part of the dielectric welding film.

The material of the adherend used in the second exemplary embodiment is not specifically limited but may be any one of an organic material, an inorganic material or a metal material or a composite of the organic, inorganic and metal materials. Examples of the organic material include a plastic material such as polypropylene resin, polyethylene resin, acrylonitrile-butadiene-styrene copolymer resin (ABS resin), polycarbonate resin, polyamide resin (e.g. Nylon 6, Nylon 66), polybutylene terephthalate resin (PBT resin), polyacetal resin (POM resin), polymethyl methacrylate resin and polystyrene resin, and a rubber material such as styrene-butadiene rubber (SBR), ethylene propylene rubber (EPR) and silicone rubber. Examples of the organic material include glass. A fiber-reinforced resin (FRP), which is a composite of glass fiber and the above plastic material, is also preferable as the material of the adherend.

In particular, the dielectric welding method of the second exemplary embodiment, which achieves tight bonding, is suitably applicable to an instance in which at least one of the adherends is made of a material of poor adhesiveness (e.g. polypropylene and polyethylene) due to its low polarity.

2. Step (2)

Figure 5:
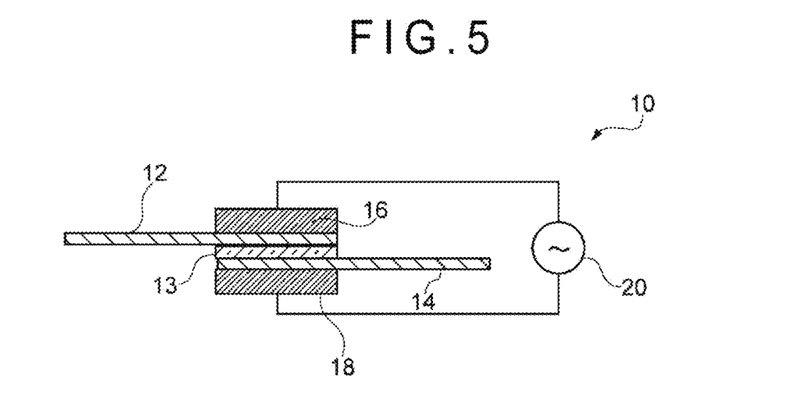
FIG. 5 illustrates dielectric heating performed by a dielectric heater.

In the step (2), dielectric heating is applied on the dielectric welding film held between the plurality of adherends with a dielectric heater, for instance, at a high-frequency output ranging from 0.1 to 20 kW for a high-frequency-wave application time ranging from 1 to 40 seconds, as shown in FIG. 5.

The dielectric welding machine used in the step (2) and dielectric heating conditions thereof will be described below.

(1) Dielectric Welding Machine

As shown in FIG. 5, a dielectric welding machine 10 performs dielectric heating through a dielectric welding film 13 held between a first adherend 12 and a second adherend 14 and applies pressure by a first high-frequency electrode 16 and a second high-frequency electrode 18 to bond the first adherend 12 and the second adherend 14.

The dielectric welding machine 10 includes a high-frequency power source 20 configured to apply a high-frequency wave of, for instance, approximately 28 MHz or 40 MHz to each of the oppositely disposed first high-frequency electrode 16 and second high-frequency electrode 18.

When a high-frequency electric field is created between the electrodes, high-frequency wave energy is absorbed by the dielectric welding film (more specifically, a dielectric heating medium uniformly dispersed in the dielectric welding film) at a part at which the first adherend and the second adherend are overlapped.

The dielectric heating medium serves as a heat source, the heat generated by the dielectric heating medium melting the olefin resin (i.e. the main component of the dielectric welding film) and thereby bonding the first adherend and the second adherend.

Subsequently, compression force is applied by the first high-frequency electrode 16 and the second high-frequency electrode 18 serving also as a press machine as shown in FIG. 5. The melting of the dielectric welding film 13 in combination with the compression force applied by the electrodes 16 and 18 achieves tight welding of the first adherend 12 and the second adherend 14.

(2) Dielectric Heating Conditions

Though the dielectric heating conditions can be altered as desired, the high-frequency output is usually preferably in a range from 0.1 to 20 kW, more preferably in a range from 0.2 to 10 kW, further preferably in a range from 0.2 to 5 kW.

The application time of the high-frequency wave is preferably in a range from 1 to 40 seconds, more preferably in a range from 5 to 30 seconds, further preferably in a range from 10 to 20 seconds.

The frequency of the high-frequency wave is preferably in a range from 1 to 100 MHz, more preferably in a range from 5 to 80 MHz, further preferably in a range from 10 to 50 MHz. Specifically, 13.56 MHz, 27.12 MHz, and 40.68 MHz of ISM band allocated by the International Telecommunication Union are used for the dielectric welding method according to the second exemplary embodiment.

EXAMPLES

Example 1

1. Preparation of Dielectric Welding Film 100 parts by weight of a polypropylene resin (NOVATEC PPMH4 manufactured by Japan Polypropylene Corporation, polypropylene homopolymer, melting point: 165 degrees C., referred to as A1 in Table 1) as the (A) component, and 69 parts by weight of zinc oxide (LPZINC11 manufactured by Sakai Chemical Industry Co., Ltd., mean particle size: 11 μm, referred to as B1 in Table 1) as the (B) component were each weighed for preparation.

Subsequently, as shown in Table 1, the (A) component and (B) component were preliminarily blended and then were fed into a hopper of a biaxial extruder of 30 mm diameter, where the components were melted and kneaded at a cylinder set temperature in a range from 180 to 200 degrees C. and a die temperature of 200 degrees C. to obtain granular pellets.

Then, the obtained granular pellets were put into a hopper of a uniaxial extruder provided with a T-die, and a 400-μm thick film-shaped molten kneaded product was extruded from the T-die at a cylinder temperature of 200 degrees C. and a die temperature of 200 degrees C., and cooled to a room temperature to obtain the dielectric welding film of Example 1.

Figure 6A:
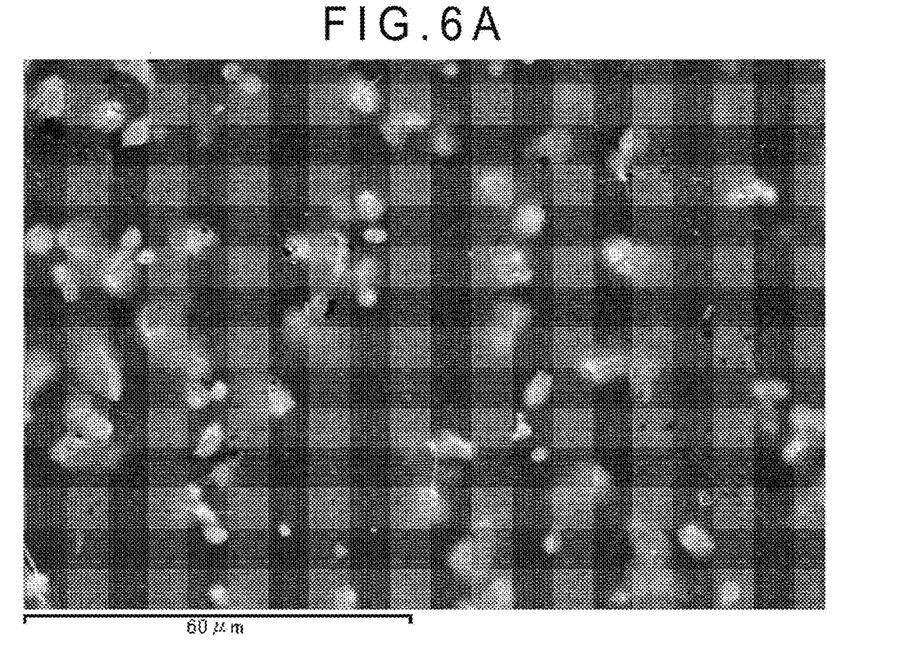
FIG. 6A shows a surface of the dielectric welding film according to an exemplary embodiment of the invention (photograph, 1000× magnification).
Figure 6B:
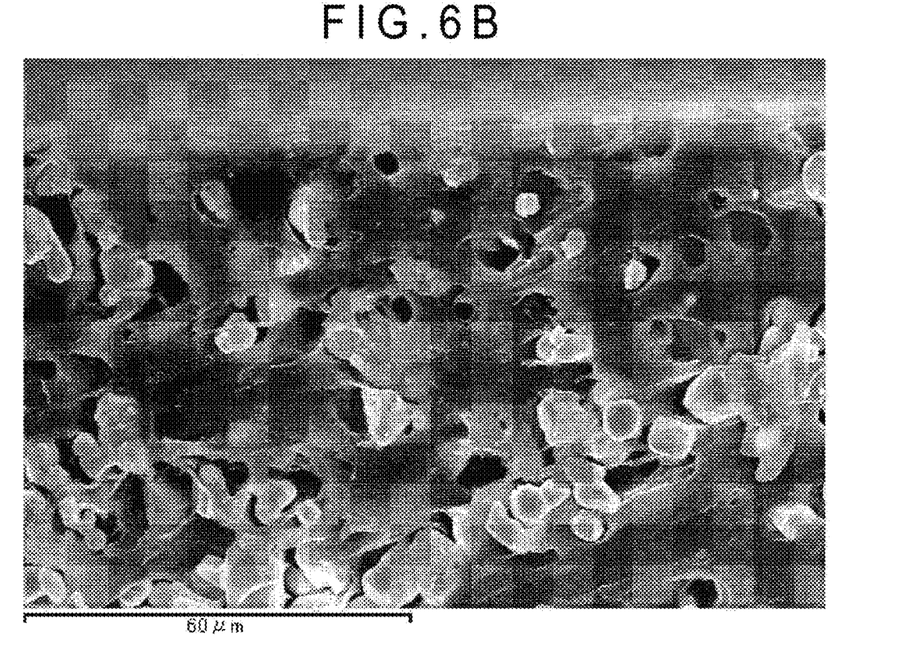
FIG. 6B shows a cross section of the dielectric welding film according to an exemplary embodiment of the invention (1000× magnification).

A surface of the dielectric welding film and a cross section of the dielectric welding film are shown in photographs (1000× magnification) in FIGS. 6A and 6B, respectively.

2 Evaluation of Dielectric Welding Film (1) Thickness

Thicknesses of the obtained dielectric welding film were measured at 10 spots with a micrometer and an average of the thicknesses was calculated.

(2) Total Light Transmissivity

The total light transmissivity was measured in accordance with JIS K 7361-1 (1997) with a haze meter NDH5000 manufactured by NIPPON DENSHOKU INDUSTRIES CO., LTD. under Illuminant D65.

(3) Dielectric Property (Tan $\delta/\epsilon'$)

With a material analyzer E4991 (manufactured by Agilent Technologies, Inc.), the permittivity E' and dissipation factor tan $\delta$ of the welding film were measured at 23 degrees C. and 40 MHz frequency to calculate the value of (tan $\delta/\epsilon'$).

(4) Storage Modulus E'

Storage modulus E' of the welding film cut into a strip of 15 mm×5 mm×1 mm was measured with a dynamic viscoelasticity measuring machine (Q-800 manufactured by TA Instruments).

Specifically, viscoelasticity measurement was performed in a tensile mode at 10 Hz frequency, at temperature-increase rate of 3 degrees C./min and in a measurement temperature range of −100 to 200 degrees. The storage modulus E' was measured at predetermined temperatures (normal temperature (23 degrees C.) and 80 degrees C.).

(5) High-Frequency Weldability

A dielectric welding film (welding film) cut into a 25 cm×12.5 cm piece was held at a predetermined position between two glass-reinforced polypropylene plates (25 cm×10 cm×1.5 mm) as adherends.

Subsequently, while the plates were held between electrodes of a high-frequency dielectric heater (YRP-400T-A manufactured by YAMAMOTO VINITA CO., LTD), a high-frequency wave of 40 MHz frequency and 200 W output was applied for a predetermined time to prepare a test piece (i.e. adherends bonded through the welding film).

High-frequency weldability of the obtained test piece was evaluated according to the standards below.

⊚: The adherends were bonded through the welding film by applying the high-frequency wave for less than 10 seconds.
○: The adherends were bonded through the welding film by applying the high-frequency wave for a time period of 10 seconds or more and less than 40 seconds.
Δ: The adherends were bonded through the welding film by applying the high-frequency wave for a time period of 40 seconds or more and less than 60 seconds.
×: The adherends were not bonded through the welding film even after applying the high-frequency wave for 60 seconds.

(6) Tensile Shear Test

With a universal tensile tester (Instron 5581 manufactured by Instron Corporation), a tensile shear force of the test piece obtained in the evaluation in "(5) High-Frequency Weldability" was measured at a tension rate of 100 mm/min, and was observed in terms of destroy mode.

⊚: Material failure or cohesive failure occurred and the tensile shear strength was 6 MPa or more.
○: Material failure or cohesive failure occurred and the tensile shear strength was 2 MPa or more and less than 6 MPa.
Δ: Interfacial peeling occurred and the tensile shear strength was less than 2 MPa.
×: The test piece was not welded in the evaluation of the high-frequency weldability, or the weld could not be kept until the test (i.e. the adherend was dropped off), so that the tensile shear test was not available.

(7) High-Temperature Creep Test

After a 100-gram weight was attached to an end of the test piece obtained in the evaluation of "(5) High-Frequency Weldability," the test piece was placed in an oven at 80 degrees C. with the weight being suspended therefrom, and was left still for 24 hours.

Lastly, the test piece, after taken out of the oven and returned to a room temperature, was evaluated in terms of the high-temperature creep according to the standards below.

⊚: The weight was kept attached after the elapse of 24 hours.
○: Though kept attached until an elapse of 12 hours, the weight was dropped after the elapse of 24 hours.
Δ: The weight was dropped off within 12 hours.
×: The test piece was not welded in the evaluation of the high-frequency weldability, or the weld could not be kept until the test (i.e. the adherend was dropped off), so that the high-temperature creep test was not available.

Example 2

In Example 2, a dielectric welding film was prepared and evaluated in the same manner as in Example 1 except that the content of the (B) component was slightly reduced (156 parts by weight with respect to 100 parts by weight of the (A) component).

Example 3

In Example 3, a dielectric welding film was prepared and evaluated in the same manner as in Example 1 except that the content of the (B) component was further reduced (267 parts by weight with respect to 100 parts by weight of the (A) component).

Example 4

In Example 4, a dielectric welding film was prepared and evaluated in the same manner as in Example 1 except that the type of zinc oxide as the (B) component was changed from B1 to B2 (LPZINC2 manufactured by Sakai Chemical Industry Co., Ltd., amorphous, mean particle size 2 μm, referred to as B2 in Table 1) and the content of the (B) component was 156 parts by weight with respect to 100 parts by weight of the (A) component.

Example 5

In Example 5, a dielectric welding film was prepared and evaluated in the same manner as in Example 1 except that the type of zinc oxide as the (B) component was changed from B1 to B3 (LPZINC20 manufactured by Sakai Chemical Industry Co., Ltd., amorphous, mean particle size: 20 μm, referred to as B3 in Table 1) and the content of the (B) component was 156 parts by weight with respect to 100 parts by weight of the (A) component.

Example 6

In Example 6, the dielectric welding film was prepared and evaluated in the same manner as in Example 1 except that random polypropylene (Prime Polypro F-744NP manufactured by Prime Polymer Co., Ltd., melting point: 130 degrees C., referred to as A2 in Table 1) was used as the (A) component, and the content of the (B) component was 156 parts by weight with respect to 100 parts by weight of the (A) component.

Example 7

In Example 7, a dielectric welding film was prepared and evaluated in the same manner as in Example 1 except that ethylene-α-olefin copolymer (EXCELLEN FX352 manufactured by SUMITOMO CHEMICAL Co., Ltd., melting point: 70 degrees C., referred to as A3 in Table 1) was used as the (A) component, and the content of the (B) component was 69 parts by weight with respect to 100 parts by weight of the (A) component.

Comparative 1

In Comparative 1, a dielectric welding film was prepared and evaluated in the same manner as in Example 1 except that the type of zinc oxide as the (B) component was changed from B1 to B4 (zinc oxide special grade, manufactured by Wako Pure Chemical Industries Ltd., amorphous, mean particle size: 0.4 μm, referred to as B4 in Table 1) and the content of the (B) component was 69 parts by weight with respect to 100 parts by weight of the (A) component.

Comparative 2

In Comparative 2, a dielectric welding film was prepared and evaluated in the same manner as in Example 1 except that the type of zinc oxide as the (B) component was changed from B1 to B5 (LPZINC-S50 manufactured by Sakai Chemical Industry Co., Ltd., spherical, mean particle size: 50 μm, referred to as B5 in Table 1) and the content of the (B) component was 69 parts by weight with respect to 100 parts by weight of the (A) component.

even with the use of a solvent or a proper adhesive, can be tightly bonded through the dielectric heating within a short time of less than 40 seconds.

Since the bonding portion can be selectively heated and melted from an outside and adherends in a form of three-dimensional components can be bonded through the dielectric heating, it is expected that this dielectric welding process is utilized for producing large-sized components and/or components with complicated structures.

Specifically, the invention, in which a predetermined welding portion is heated from an outside through the dielectric heating, is suitable for bonding thick components, three-dimensional components and components with small acceptable tolerance.

In particular, since the invention allows local application to a bonding portion of adherends, the invention is expect-

TABLE 1

| | | | Examples | | | | |
|---|---|---|---|---|---|---|---|
| | | | 1 | 2 | 3 | 4 | 5 |
| Resin Composition | (A) Component | Type | A1 homo poly-propylene | A1 homo poly-propylene | A1 homo poly-propylene | A1 homo poly-propylene | A1 homo poly-propylene |
| | | Melting point (° C.) | 165 | 165 | 165 | 165 | 165 |
| | | MFR (g/10 min) | 5 | 5 | 5 | 5 | 5 |
| | | Parts by weight | 100 | 100 | 100 | 100 | 100 |
| | (B) Component | Type | B1 zinc oxide | B1 zinc oxide | B1 zinc oxide | B2 zinc oxide | B3 zinc oxide |
| | | Particles size (μm) | 11 | 11 | 11 | 2 | 20 |
| | | Parts by waight | 69 | 156 | 267 | 156 | 156 |
| Evaluation of Welding Film | | Thickness (μm) | 400 | 400 | 400 | 400 | 400 |
| | | Total light transmissivity (%) | 29 | 23 | 19 | 9 | 35 |
| | | dielectric property (tanδ/ε') | 0.008 | 0.016 | 0.028 | 0.008 | 0.008 |
| | | Storage modulus E' (23° C.) (MPa) | 2,370 | 2,450 | 2,710 | 2,180 | 2,650 |
| | | Storage modulus E' (80° C.) (MPa) | 540 | 560 | 600 | 530 | 590 |
| | | High-frequency dielectric weldability | ○ | ○ | ◎ | ○ | ○ |
| | | Tensile shear test | ◎ | ◎ | ◎ | ◎ | ◎ |
| | | High-temperature creep resistance | ◎ | ◎ | ◎ | ◎ | ◎ |

| | | | Examples | | Comparatives | |
|---|---|---|---|---|---|---|
| | | | 6 | 7 | 1 | 2 |
| Resin Composition | (A) Component | Type | A2 random poly-propylene | A3 ethylene/α-olefin copolymer | A1 homo poly-propylene | A1 homo poly-propylene |
| | | Melting point (° C.) | 130 | 70 | 165 | 165 |
| | | MFR (g/10 min) | 7 | 4 | 5 | 5 |
| | | Parts by weight | 100 | 100 | 100 | 100 |
| | (B) Component | Type | B1 zinc oxide | B1 zinc oxide | B4 zinc oxide | B5 zinc oxide |
| | | Particles size (μm) | 11 | 11 | 0.4 | 50 |
| | | Parts by waight | 156 | 69 | 69 | 69 |
| Evaluation of Welding Film | | Thickness (μm) | 400 | 400 | 400 | 400 |
| | | Total light transmissivity (%) | 24 | 27 | 2 | 40 |
| | | dielectric property (tanδ/ε') | 0.016 | 0.008 | 0.002 | 0.002 |
| | | Storage modulus E' (23° C.) (MPa) | 1,320 | 160 | 2,380 | 2,320 |
| | | Storage modulus E' (80° C.) (MPa) | 270 | 0.4 | 540 | 540 |
| | | High-frequency dielectric weldability | ○ | ○ | Δ | X |
| | | Tensile shear test | ◎ | ◎ | X | X |
| | | High-temperature creep resistance | ◎ | X | X | X |

INDUSTRIAL APPLICABILITY

With the use of the dielectric welding film according to the exemplary embodiments of the invention, adherends, which are made of hydrocarbon-based non-polar thermoplastic resin (e.g. polyolefin resin) and usually hard to bond able to be effective in bonding large-sized and complicated three-dimensional structures, laminated structures, and the like.

Accordingly, the invention allows highly tightly welding of polyolefin-resin adherends, and is applicable to a high-performance thermoplastic resin composite such as fiber-reinforced plastics (FRP), which is expected to be increasingly widely used in the time to come.

Further, the invention allows relatively easy control of physical properties such as the thickness and storage modulus of the welding film, and thus is applicable to a roll-to-roll process. Further, the dielectric welding film can be designed into any size and shape by punching or the like depending on the adhesion area and shape between the plurality of adherends.

In addition, the invention is expected to be used as a bonding technology for bonding fiber-reinforced plastics (FRP) in the fields of airplane and automobile whose weight is increasingly reduced, and for bonding components of electronics and medical equipment whose size is increasingly reduced and structure is increasingly complicated.

In this regard, polyolefin resin such as polyethylene and polypropylene, which is inferior in solvent resistance, is hard to bond with an adhesive diluted with solvent. Meanwhile, a mechanical connector such as a bolt and a rivet for bonding polyolefin resin increases the weight of the component and may be inferior in the strength of the bonded portion.

According to the invention, the polyolefin resin and the like can be stably and tightly bonded without increasing weight of the component.

EXPLANATION OF CODES

10: high-frequency dielectric heater
12: first adherend
13: dielectric welding film
14: second adherend
16: first high-frequency electrode (also serving as a part of a press machine)
18: second high-frequency electrode (also serving as a part of a press machine)
20: high-frequency power source

The invention claimed is:

1. A dielectric welding film configured to bond a plurality of adherends of the same material or different materials through dielectric heating, the dielectric welding film comprising:
    (A) a polyolefin resin; and
    (B) a dielectric filler whose mean particle size measured in accordance with JIS Z 8819-2 (2001) is in a range from 2 to 25 µm, wherein
    the dielectric filler is zinc oxide, anatase-type titanium oxide or barium titanate,
    a thickness of the dielectric welding film is in a range from 100 to 1000 µm and
    a dielectric property ($\tan\delta/\varepsilon'$) defined by dividing a dissipation factor $\tan\delta$ by a permittivity $\varepsilon'$ at 23 degrees C. and 40 MHz frequency is 0.005 or more.

2. The dielectric welding film according to claim 1, wherein the (A) component is a polypropylene resin.

3. The dielectric welding film according to claim 2, wherein a melting point or a softening point of the polypropylene resin as the (A) component defined in accordance with JIS K 7121 (1987) is in a range from 80 to 200 degrees C.

4. The dielectric welding film according to claim 1, wherein a content of the (B) component is in a range from 5 to 800 parts by weight with respect to 100 parts by weight of the (A) component.

5. The dielectric welding film according to claim 1, wherein a storage modulus E' measured at 23 degrees C. and 10 Hz frequency and a storage modulus E' measured at 80 degrees C. and 10 Hz frequency are both in a range from $1\times10^6$ to $1\times10^{10}$ Pa.

6. The dielectric welding film according to claim 1, wherein the (B) component is zinc oxide.

7. The dielectric welding film according to claim 1, wherein a light transmissivity of the dielectric welding film is 5% or more.

8. A bonding method using a dielectric welding film configured to bond a plurality of adherends of the same material or different materials through dielectric heating, the dielectric welding film comprising (A) a polyolefin resin and (B) a dielectric filler whose mean particle size measured in accordance with JIS Z 8819-2 (2001) is in a range from 2 to 25 µm, the dielectric filler being zinc oxide, anatase-type titanium oxide or barium titanate, a thickness of the dielectric welding film ranging from 100 to 1000 µm, the method comprising:
    (1) holding the dielectric welding film between the plurality of adherends of the same material or different materials; and
    (2) applying the dielectric heating on the dielectric welding film held between the plurality of adherends with a dielectric heater at a frequency ranging from 1 to 100 MHz wherein a dielectric property ($\tan\delta/\varepsilon'$) defined by dividing a dissipation factor $\tan\delta$ by a permittivity $\varepsilon'$ at 23 degrees C. and 40 MHz frequency is 0.005 or more.

9. The bonding method using a dielectric welding film according to claim 8, wherein
    the (B) component is zinc oxide.

10. The bonding method using a dielectric welding film according to claim 8, wherein
    a high frequency is applied in (2) applying the dielectric heating at a high-frequency output ranging from 0.1 to 20 kW and a high-frequency-wave application time of 1 second or more and less than 40 seconds.

* * * * *